United States Patent
Harada et al.

(10) Patent No.: US 7,314,530 B2
(45) Date of Patent: Jan. 1, 2008

(54) PRESS AND MAGNET MANUFACTURING METHOD

(75) Inventors: Tsutomu Harada, Settsu (JP); Takashi Tajiri, Osaka (JP); Shuichi Okuyama, Hyogo (JP)

(73) Assignee: Neomax Co., Ltd., Osaka (JP)

( * ) Notice: Subject to any disclaimer, the term of this patent is extended or adjusted under 35 U.S.C. 154(b) by 583 days.

(21) Appl. No.: 10/490,421

(22) PCT Filed: Oct. 1, 2002

(86) PCT No.: PCT/JP02/10236

§ 371 (c)(1),
(2), (4) Date: Mar. 23, 2004

(87) PCT Pub. No.: WO03/031168

PCT Pub. Date: Apr. 17, 2003

(65) Prior Publication Data

US 2004/0244872 A1    Dec. 9, 2004

(30) Foreign Application Priority Data

Oct. 2, 2001  (JP)  ............................. 2001-306406
Jul. 16, 2002 (JP)  ............................. 2002-206487

(51) Int. Cl.
    *H01F 1/04* (2006.01)
(52) U.S. Cl. ..................... 148/103; 148/101
(58) Field of Classification Search .................... None
    See application file for complete search history.

(56) References Cited

U.S. PATENT DOCUMENTS

| 3,560,200 | A | * | 2/1971 | Nesbitt et al. ................. 75/246 |
| 4,211,585 | A | * | 7/1980 | Inomata et al. ............. 420/435 |
| 4,578,125 | A | * | 3/1986 | Sahashi et al. ............. 148/303 |
| 4,601,875 | A | * | 7/1986 | Yamamoto et al. ........... 419/23 |
| 5,250,255 | A | | 10/1993 | Sagawa et al. |
| 5,383,978 | A | | 1/1995 | Yamamoto et al. |
| 6,299,832 | B1 | | 10/2001 | Kohara et al. |
| 6,332,932 | B1 | | 12/2001 | Kohara et al. |
| 6,371,746 | B1 | * | 4/2002 | Shiomi et al. ................. 425/78 |
| 6,413,457 | B1 | | 7/2002 | Fukushima et al. |
| 6,599,468 | B2 | | 7/2003 | Okuyama et al. |
| 6,656,329 | B1 | * | 12/2003 | Ma et al. ................. 204/192.1 |
| 7,094,047 | B2 | * | 8/2006 | Yamada et al. ............. 425/380 |

(Continued)

FOREIGN PATENT DOCUMENTS

EP    0 999 039 A2    5/2000

(Continued)

*Primary Examiner*—John P. Sheehan
(74) *Attorney, Agent, or Firm*—Jeffrey L. Costellia; Nixon Peabody, LLP

(57) ABSTRACT

A press machine 10 includes a die 12 with a through hole 12a that defines a cavity, a first press surface 14a and a second press surface 16a for pressing a magnetic powder 18 loaded in the cavity, and magnetic field generating means for applying an aligning magnetic field to the magnetic powder 18 in the cavity. At least one of the first and second press surfaces 14a and 16a has a region made of a material having a Vickers hardness that is higher than 200 but equal to or lower than 450. In pressing the powder under the aligning magnetic field, the press machine 10 minimizes the disturbance in the orientation of the powder.

10 Claims, 7 Drawing Sheets

U.S. PATENT DOCUMENTS

| | | | |
|---|---|---|---|
| 2004/0079190 A1* | 4/2004 | Kuwabara et al. | 75/238 |
| 2007/0098832 A1* | 5/2007 | Kuwabara et al. | 425/218 |

FOREIGN PATENT DOCUMENTS

| | | | |
|---|---|---|---|
| EP | 1 020 285 A2 | | 7/2000 |
| JP | 63-033505 | | 2/1988 |
| JP | 20155520 | * | 6/1990 |
| JP | 02-240201 | | 9/1990 |
| JP | 06-218587 | | 8/1994 |
| JP | 06-330102 | | 11/1994 |
| JP | 8-309457 | * | 11/1996 |
| JP | 09-003572 | | 1/1997 |
| JP | 09-035978 | | 2/1997 |
| JP | 09-150298 | | 6/1997 |
| JP | 11-314237 | * | 11/1999 |
| JP | 2000-254907 | | 9/2000 |
| JP | 2001-58294 | | 3/2001 |

* cited by examiner (a)

BEFORE PRESSED (UNDER MAGNETIC FIELD)

(b)

AFTER PRESSED (a)

BEFORE PRESSED (UNDER MAGNETIC FIELD)

(b)

AFTER PRESSED (a)

(b)

PRESS AND MAGNET MANUFACTURING METHOD

TECHNICAL FIELD

The present invention relates to a powder press machine and a method for producing a magnet. More particularly, the present invention relates to a method for producing a rare-earth sintered magnet and a powder press machine for producing such a magnet.

BACKGROUND ART

Rare-earth sintered magnets currently used extensively in various applications include rare-earth-cobalt based magnets and rare-earth-iron-boron based magnets. Among other things, the rare-earth-iron-boron based magnets (which will be referred to herein as "R-T-(M)-B based magnets", where R is one of the rare-earth elements including Y, T is either Fe alone or a mixture of Fe, Co and/or Ni, M is an additive element (e.g., at least one of Al, Ti, Cu, V, Cr, Ni, Ga, Zr, Nb, No, In, Sn, Hf, Ta and W) and B is either boron alone or a mixture of boron and carbon) are used more and more often in various electronic appliances. This is because an R-T-(M)-B based magnet exhibits a higher maximum energy product than any of various other types of magnets and yet is relatively inexpensive.

As the applications of those rare-earth sintered magnets expand, it becomes increasingly necessary to produce magnets in various shapes. For example, to produce a high-performance motor, a number of strong anisotropic magnets with a curved surface are required. To produce such an anisotropic magnet, a powder compact needs to be compacted into a desired shape by pressing a magnetic powder that has been aligned under a magnetic field. A high-performance rotating machine such as a motor uses a plurality of thin-plate magnets with a C- or arched cross section. The performance of such a rotating machine cannot be improved sufficiently just by increasing the magnetic force of the magnets. In addition, the resultant magnet shape and magnetic field distribution in the vicinity of the magnet surface also have to be just as designed.

In the prior art, the pair of punches of a press machine has curved press surfaces, thereby obtaining a powder compact with desired curved surfaces. The conventional punches may be made of a cemented carbide (e.g., a WC—Ni based alloy) and the press surfaces thereof may be mirror polished.

However, the present inventors discovered and confirmed via experiments that if the press surfaces were mirror-polished curved surfaces while a magnetic powder was uniaxially pressed under an aligning magnetic field, then the orientation of the magnetic powder was disturbed and the resultant magnet performance was not so good. This problem is quite noticeable particularly when the pressing direction is substantially the same as the direction of the aligning magnetic field.

If permanent magnets are made of such a compact with the disturbed orientation and used to produce a motor, then a non-negligible degree of cogging will be created in the torque of the motor. The "torque cogging" is a torque variation resulting from a variation in the magnetic resistance of the magnetic circuit of a motor with the rotational position of a rotor. The magnitude of this torque variation is usually small. However, if the cogging torque phenomenon occurs in a power steering motor, for example, then that variation could be quite sensible to some drivers. This torque cogging becomes even more perceivable when there is such disturbed orientation in the convex portion of each magnet (i.e., a portion of the motor facing a coil).

The above-mentioned problem that a magnetic powder, which has been aligned under a magnetic field and is now being pressed uniaxially, can have disturbed orientation arises not only when the press surfaces are curved but also when one of the two press surface has a region that is tilted with respect to the pressing direction. This phenomenon occurs during the manufacturing process of magnets in any of various shapes.

Also, a slicing technique is often used as a method for filling a cavity with a magnetic powder. For example, as disclosed in Japanese Laid-Open Publication No. 2000-248301, a feeder box (or a feeder cup) is slid over a cavity, a powder in the feeder box is loaded into the cavity by utilizing the weight of the powder itself, and the upper portion of the loaded magnetic powder is pressed downward by some pressing means such as an agitator (also called a "shaker") provided within the feeder box 13.

However, the surface of a magnetic powder that has been loaded by such a slicing technique is not always parallel to the surface of a die (i.e., the bottom of the cavity) but may be either tilted in the direction in which the agitator (or the feeder box) moves or even winding. In that case, even if the magnetic powder is pressed between two mutually parallel press surfaces, at least a portion of the upper press surface (i.e., the surface of the upper punch) contacts with the surface of the magnetic powder obliquely. If the magnetic powder that has been aligned under the magnetic field is pressed in such a state, then the magnetic powder particles in the vicinity of the press surface will also have disturbed orientation due to the movement of the compressed magnetic powder just as described above.

DISCLOSURE OF INVENTION

In order to overcome the problems described above, an object of the present invention is to provide a press machine to make a magnetic powder compact just as intended, and a method for producing a magnet, with the disturbance in the orientation of the magnetic powder minimized.

A press machine according to the present invention includes: a die with a through hole that defines a cavity; a first press surface and a second press surface for pressing a magnetic powder loaded in the cavity; and magnetic field generating means for applying an aligning magnetic field to the magnetic powder in the cavity. At least one of the first and second press surfaces has a first region, which is made of a first material having a Vickers hardness that is higher than 200 but equal to or lower than 450, thereby achieving the object described above.

The at least one press surface may further have a second region, which is made of a second material having a higher Vickers hardness than the first material.

In one preferred embodiment, the at least one press surface has a region which is tilted with respect to a pressing direction.

The first and second materials preferably have permeabilities of 1.01 or less, more preferably 1.001 or less.

The first material is preferably a BeCu alloy.

The BeCu alloy preferably includes 96.9 mass % to 98.2 mass % of Cu and 1.6 mass % to 2.0 mass % of Be.

In one preferred embodiment, the at least one press surface is curved.

A method for producing a magnet according to the present invention includes the steps of: preparing a magnetic powder; loading the magnetic powder into a cavity; aligning the magnetic powder by applying an aligning magnetic field to the magnetic powder in the cavity; and uniaxially pressing the aligned magnetic powder between two opposed press surfaces to make a compact. At least one of the two press surfaces has a region that is tilted with respect to the surface of the magnetic powder loaded and/or a pressing direction and also has a first region, which is made of a first material with a Vickers hardness that is higher than 200 but equal to or lower than 450, thereby achieving the object described above.

The at least one press surface may further have a second region, which is made of a second material having a higher Vickers hardness than the first material.

The first and second materials preferably have permeabilities of 1.01 or less, more preferably 1.001 or less.

The first material is preferably a BeCu alloy.

The BeCu alloy preferably includes 96.9 mass % to 98.2 mass % of Cu and 1.6 mass % to 2.0 mass % of Be.

In one preferred embodiment, the at least one press surface is curved.

The step of uniaxially pressing may be the step of making a compact with a C- or arched cross section.

In another preferred embodiment, the magnetic powder is loaded into the cavity by a slicing technique. The magnetic powder preferably has a mean particle size (i.e., FSS particle size) of 2 μm to 10 μm.

In still another preferred embodiment, the aligning magnetic field is parallel to the pressing direction. The aligning magnetic field preferably has a strength of 0.5 MA/m to 2.0 MA/m. The aligning magnetic field may be either a static magnetic field or a pulse magnetic field.

In yet another preferred embodiment, the magnetic powder includes a rare-earth alloy powder.

A motor according to the present invention includes a magnet produced by one of the methods described above.

BEST MODE FOR CARRYING OUT THE INVENTION

Figure 1:
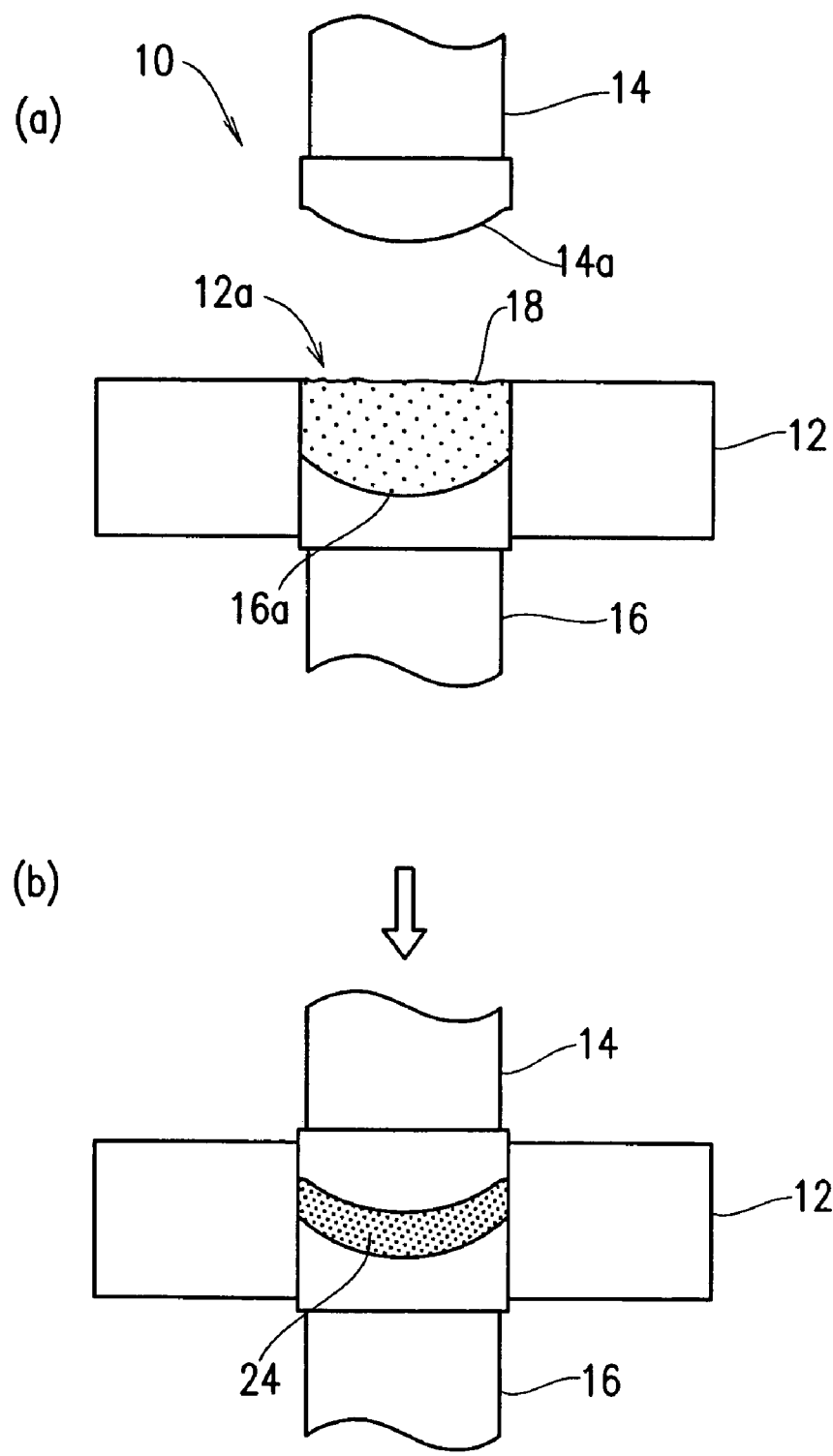
FIGS. 1(a) and 1(b) are schematic representations showing the main portion of a powder press machine 10 according to a preferred embodiment.

In a press machine according to the present invention, at least one of the two press surfaces thereof for pressing magnetic powder particles, which are aligned in a cavity under a magnetic field, has a region (first region) which is made of a material (first material) with a Vickers hardness that is higher than 200 but equal to or lower than 450. Having a hardness falling within this range, the first region of the press surface is deformed plastically under the force pressing the magnetic powder particles, thereby creating fine unevenness corresponding to the shapes of the magnetic powder particles in the first region of the press surface. The fine unevenness that has been formed in the first region of the press surface functions so as to catch the magnetic powder particles and prevent them from moving. Accordingly, if a portion of the press surface on which the orientation is often disturbed includes the first region, the disturbance in the orientation of the magnetic powder particles in the vicinity of the first region of the press surface can be minimized and the powder particles in the compact can be aligned parallel to the direction of the aligning magnetic field. In this case, at least one of the two press surfaces may have the first region. The region other than the first region (i.e., a second region) may be made of a material (i.e., a second material) with a higher Vickers hardness than the first material.

The disturbance in the orientation of magnetic powder particles in the vicinity of the press surface also affects even magnetic powder particles inside of a compact due to magnetic interactions. As a result, the orientation direction of the powder particles inside of the compact becomes no longer parallel to the direction of the aligning magnetic field and the magnetic properties of the resultant sintered magnet deteriorate. However, according to the present invention, such disturbance in the orientation of magnetic powder particles can be minimized.

Particularly, in a so-called "parallel pressing" process in which the direction of the aligning magnetic field is the same as the pressing direction, the magnetic powder particles easily move perpendicularly to the pressing direction due to the force applied from the press surfaces. The resultant disturbance in orientation seriously affects the magnetic properties of the sintered magnet. Thus, the press machine of the present invention can be used particularly effectively in that situation.

The magnetic powder particles that have been loaded into the cavity are movable especially easily under the force applied from the press surfaces when the press surfaces have a region that is tilted with respect to the pressing direction (e.g., when the press surfaces themselves are tilted with respect to the pressing direction) or when the press surfaces are curved. It should be noted that the phrase "the press surfaces are tilted with respect to the pressing direction" means that the press surfaces are not perpendicular to the pressing direction.

Particularly when a compact having a C- or arched cross section (e.g., a sintered magnet for a motor) is made, the two press surfaces are both curved and have mutually different shapes (i.e., their cross-sectional shapes as taken in the pressing direction). Accordingly, the orientation is often disturbed on both of the two press surfaces. In that case, both of the two press surfaces are preferably made of a material with a Vickers hardness falling within the range described above.

Even if the two press surfaces are mutually parallel flat planes, the surfaces of the magnetic powder that has been loaded into the cavity may not be flat. In that case, the press surfaces in contact with the surfaces of the magnetic powder are also tilted. Even so, by using press surfaces that are made of a material with a Vickers hardness falling within the range specified above, the disturbance in the orientation of the magnetic powder particles can also be minimized. Accordingly, the effects of the present invention are achieved when the cavity is filled with the magnetic powder material by a mass-producible slicing technique, for example.

It should be noted that if the material of the press surfaces had a Vickers hardness exceeding 450, then the press surfaces could not be plastically deformed well enough to achieve the effects of minimizing the orientation disturbance fully. However, if the Vickers hardness were 200 or less, then the shape of the resultant compact would be somewhat different from the predetermined shape. Accordingly, it might take a longer time to carry out the subsequent process step of reshaping the compact or the life of the press surfaces might be shorter than expected. Considering the shape precision of the compact and the life of the punches (or press surfaces), a material with a Vickers hardness of at least 250 is more preferably used.

If the press surfaces are made of a material with a permeability of 1.01 or less, then the aligning magnetic field is not affected by this material at all. Thus, an aligning magnetic field with a predetermined direction can be applied to the magnet powder within the cavity. More preferably, the material of the press surfaces has a permeability of 1.001 or less. In contrast, if the press surfaces are made of a Cr—Ni based stainless steel (SUS 304 according to JIS standards and having a permeability of about 1.02 to about 1.06), for example, then the flux density will be relatively high around the center of the cavity, the magnet powder will be concentrated toward that region, and the orientation will be disturbed easily. A BeCu alloy (among other things, a BeCu alloy including 96.9 mass % to 98.2 mass % of Cu and 1.6 mass % to 2.0 mass % of Be) is preferably used.

A BeCu alloy is also less expensive than a cemented carbide. Also, since the press surfaces are deformed plastically as a result of the pressing process, there is no need to mirror-polish those surfaces. Accordingly, a material that has just been shaped by an electrical discharge, for example, may be used as it is, thus further cutting down the cost advantageously. Furthermore, the BeCu alloy is also machinable easily and can be used effectively as a material for the punches for producing numerous sorts of magnets in small quantities. It should be noted that even when the BeCu alloy is used, the pressing process could be carried out repeatedly up to about 1,000 shots, for example.

Hereinafter, preferred embodiments of the present invention will be described with reference to the accompanying drawings. In the following illustrative preferred embodiments, the two press surfaces are both supposed to be curved. However, the present invention is in no way limited to those specific preferred embodiments.

Press Machine

FIGS. 1(*a*) and 1(*b*) illustrate the main portion of a powder press machine 10 according to this preferred embodiment. The press machine 10 shown in FIG. 1 includes a die 12 with a through hole (i.e., die hole) 12*a* to define a cavity and an upper punch 14 and a lower punch 16 for compressing a magnetic powder 18 within the through hole. The end of the upper punch 14, including its compression axis, has a convex cross-sectional shape, while the end of the lower punch 16 has a concave cross-sectional shape. A die set, consisting of the die 12, upper punch 14 and lower punch 16, is connected to a driver (not shown) so as to perform a vertical motion as required for a pressing process. The press machine 10 of this preferred embodiment operates in basically the same way as any known press machine.

Figure 2:
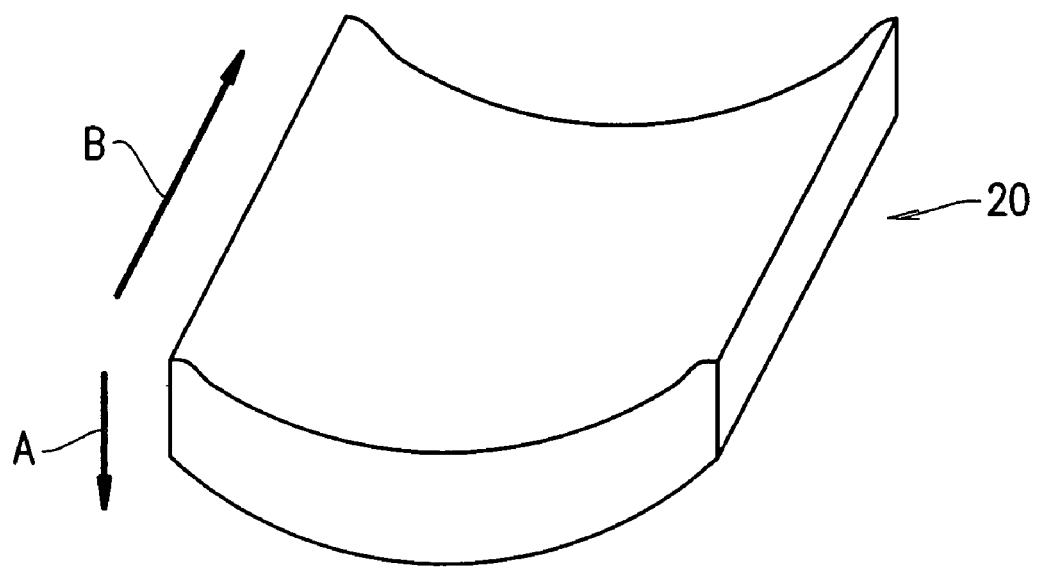
FIG. 2 is a perspective view of an arched rare-earth magnet to be produced as a preferred embodiment of the present invention.

The shape of the die set for use in this preferred embodiment is designed so as to produce an arched thin-plate rare-earth magnet 20 as shown in FIG. 2. This rare-earth magnet 20 is magnetized parallel to the arrow A shown in FIG. 2 (i.e., in the pressing direction). The rare-earth magnet 20 shown in FIG. 2 may be used as a part of a motor or any other rotating machine. When the magnet 20 is used for a motor, the shape of the magnet 20 is preferably designed so as to produce a skew and thereby reduce cogging torque.

Look at FIG. 1(*a*) again.

The cavity is formed over the upper portion of the lower punch 16 that has been partially inserted into the through hole 12*a* of the die 12, and is filled with the magnetic powder 18. The cavity is a compacting space to be defined by the press surface 16*a* of the lower punch 16 and the inner surface of the through hole 12*a*.

The powder is loaded into the cavity by transporting a feeder box (not shown), which is filled with the magnetic powder, to over the cavity and dropping the powder into the cavity through the bottom (opening) of the feeder box. The cavity cannot be filled with the powder uniformly just by letting the powder drop due to its gravitation. Accordingly, the magnetic powder 18 is preferably stuffed into the cavity by driving a shaker (not shown), provided inside of the feeder box, horizontally (see Japanese Laid-Open Publication No. 2000-248301 mentioned above).

While the feeder box is retreating from over the cavity, the top of the magnetic powder 18 is sliced off with the bottom edge of the feeder box, thereby loading a predetermined amount of powder 18 to be compacted into the cavity highly precisely. In the meantime, the surface of the magnetic powder 18 loaded may be partially tilted with respect to the surface of the die 12.

This press machine 10 is characterized in that the press surfaces 14*a* and 16*a* of the upper and lower punches 14 and 16 are made of a BeCu alloy (e.g., BC-2 produced by Sumitomo Special Metals Co., Ltd). The BeCu alloy is a non-magnetic material with a Vickers hardness higher than 200 but equal to or lower than 450 and a permeability of 1.001 or less. A BeCu alloy including 96.9 mass % to 98.2 mass % of Cu and 1.6 mass % to 2.0 mass % of Be satisfies these Vickers hardness and permeability ranges.

In the press machine 10 of this preferred embodiment, the press surfaces 14*a* and 16*a* are fully made of the BeCu alloy. Accordingly, the disturbance in the orientation of the magnetic powder 18 can be minimized effectively as will be described later. In this example, the press surfaces 14*a* and 16*a* are completely made of the BeCu alloy. However, the effects of reducing the disturbance in the orientation of the magnetic powder 18 are achievable if at least one of the two press surfaces 14*a* and 16*a* has a region that is made of the BeCu alloy (i.e., a first region).

It should be noted that even when the press surfaces 14*a* and 16*a* are fully made of the BeCu alloy, just the press surfaces 14*a* and 16*a*, not the whole upper and lower punches 14 and 16, need to be made of the BeCu alloy. Nevertheless, to achieve a sufficient degree of plastic deformation, portions with a thickness of about 2 mm or more, including the press surfaces, are preferably made of the BeCu alloy. Normally, if the press surfaces having predetermined shapes are made of a BeCu alloy block, these conditions are satisfied easily. Since the BeCu alloy has some elasticity, a clearance of about 5 µm to about 60 µm is preferably provided between the side surfaces of the upper punch 14 and through hole 12a and/or between the side surfaces of the lower punch 16 and through hole 12a.

When the cavity has been filled with the magnetic powder 18, the upper punch 14 starts to be lowered. The press surface 14a of the upper punch 14 presses the upper surface of the underlying powder 18 as shown in FIG. 1(b). After the magnetic powder 18 has been completely enclosed by the upper punch 14, lower punch 16 and die 12, a magnetic field generating coil (not shown) applies an aligning magnetic field to the powder 18 in the cavity. The magnetic flux is lead into the upper and lower punches 14 and 16, thereby making the direction of the aligning magnetic field within the cavity identical with the pressing direction (i.e., the direction in which the upper punch operates). Under this aligning magnetic field, the powder particles being pressed are aligned with the direction of the magnetic field. The aligning magnetic field preferably has a strength of 0.5 MA/m to 2.0 MA/m. The aligning magnetic field may be either a static magnetic field or a pulse magnetic field.

With the aligning magnetic field applied to the powder, the magnetic powder within the cavity is compressed and compacted by the upper and lower punches 14 and 16, thereby making a powder compact 24. In the course of this pressing process, the particles of the magnetic powder 18 being pressed receive different stresses (or pressures) depending on their locations. After the compact 24 has been obtained, the upper punch 14 will be raised and the lower punch 16 will push the compact 24 upward, thereby extracting the compact 24 from the die hole 12a.

Figure 3:
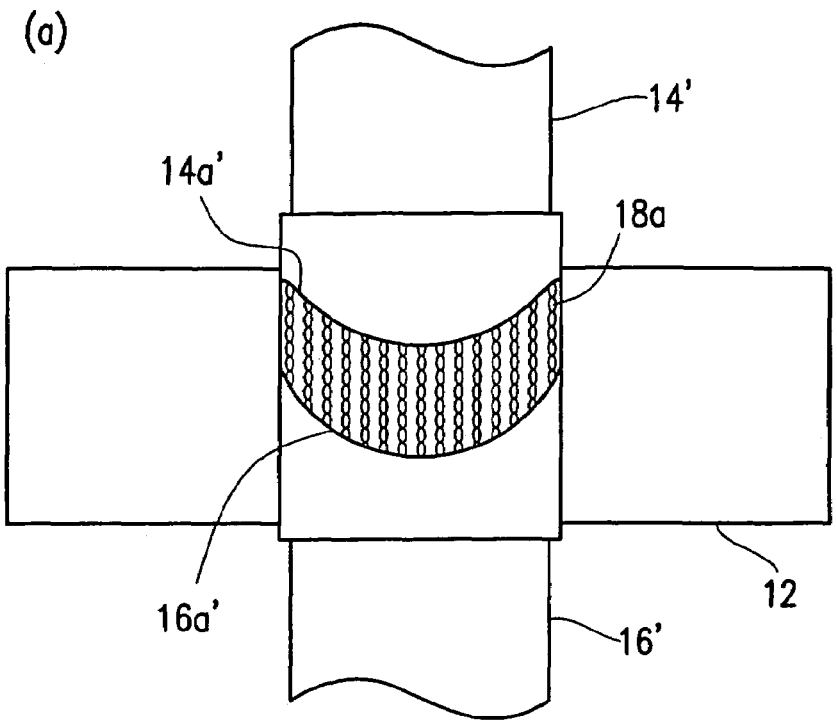
FIG. 3(a) is a cross-sectional view schematically illustrating the state of a powder during an early stage of a pressing process step being performed by a conventional press machine.
FIG. 3(b) is a cross-sectional view schematically illustrating the state of the powder during a late stage of the pressing process step.
Figure 3:
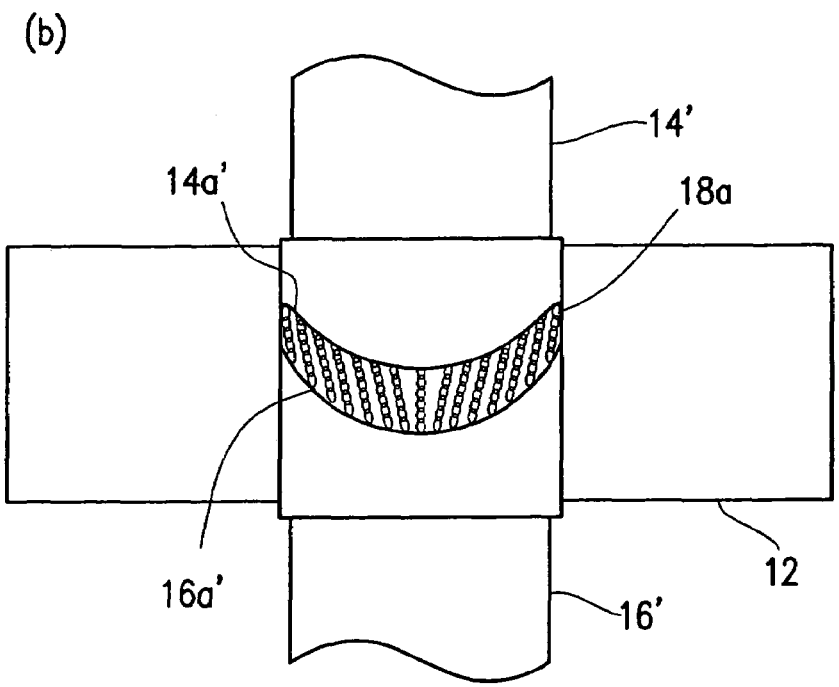

FIG. 3(a) schematically illustrates how the magnetic powder particles 18a are oriented in the initial stage of a pressing process performed by a conventional press machine. On the other hand, FIG. 3(b) schematically illustrates how the magnetic powder particles 18a are oriented in the late stage of the pressing process.

The respective magnetic powder particles 18a under the aligning magnetic field are not only oriented toward the direction of the aligning magnetic field but also are strongly coupled together magnetically. As a result, the powder particles 18a are aligned with the direction of the aligning magnetic field as shown in FIG. 3(a). As the distance between the upper and lower punches 14' and 16' is decreased with the aligning magnetic field applied, non-uniform pressures (or stresses) are applied to the respective portions of the powder being pressed because the punch surfaces 14a' and 16a' are curved. However, if the press surfaces 14a' and 16a' are made of a much harder cemented carbide and are mirror-polished smooth surfaces, then the powder particles will slide on the smooth press surfaces 14a' and 16a' laterally (i.e., directions including a component perpendicular to the pressing direction). As a result, the orientation is disturbed as shown in FIG. 3(b).

Figure 4:
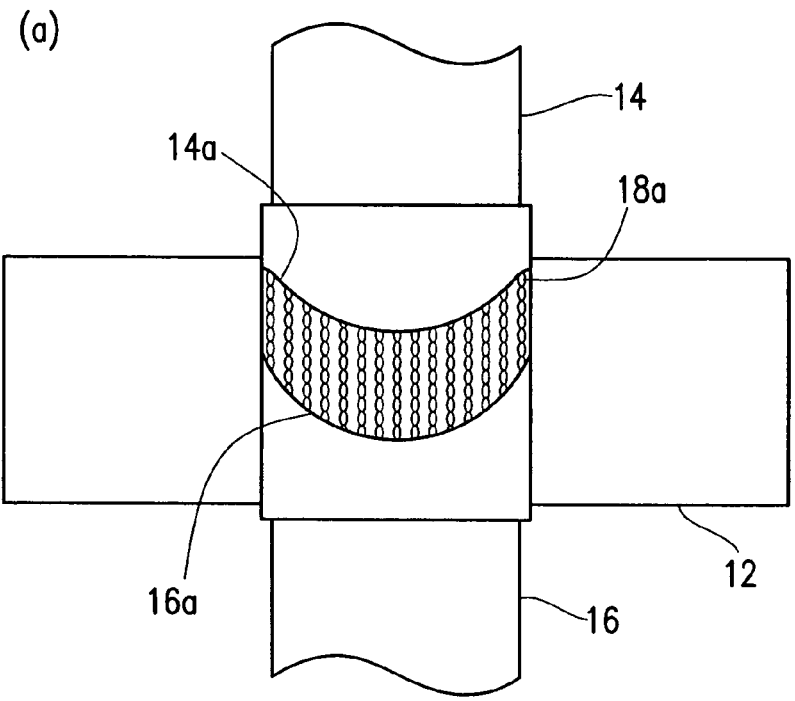
FIG. 4(a) is a cross-sectional view schematically illustrating the state of a powder during an early stage of a pressing process step being performed by a press machine according to a preferred embodiment.
FIG. 4(b) is a cross-sectional view schematically illustrating the state of the powder during a late stage of the pressing process step.
Figure 4:
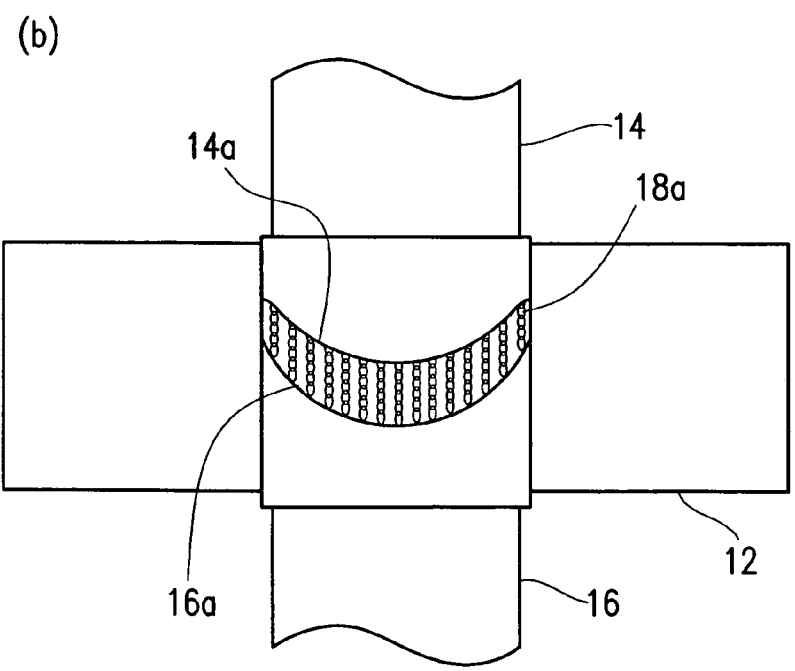
Figure 5:
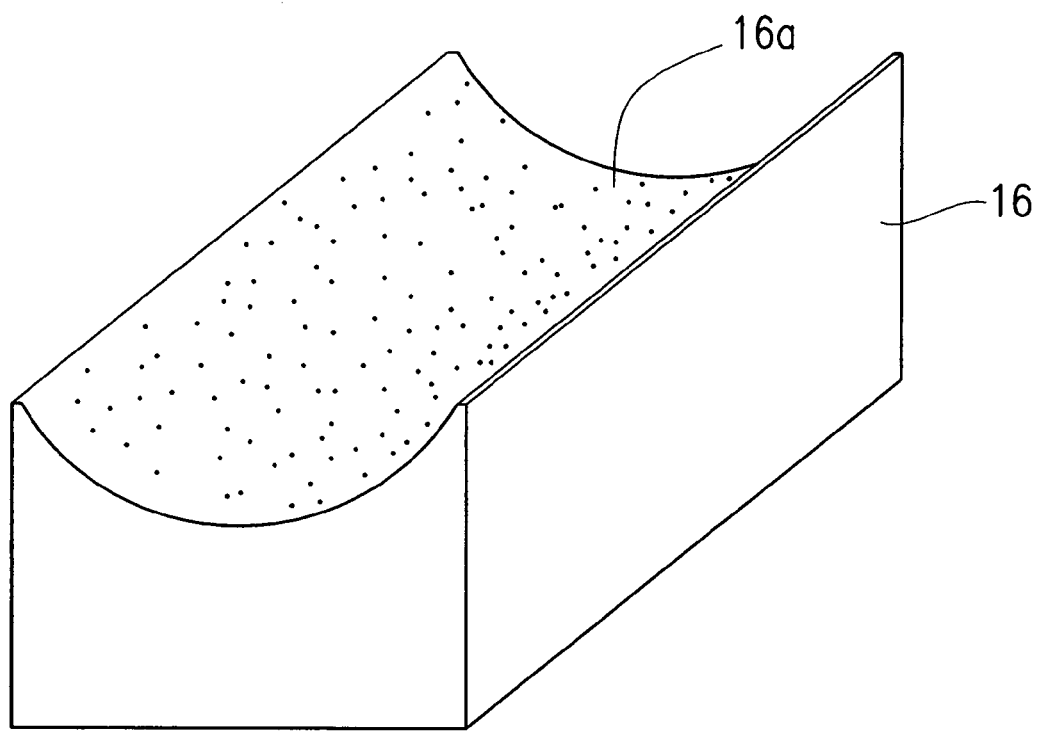
FIG. 5 is a perspective view schematically illustrating how the lower punch 16 of the press machine according to the preferred embodiment looks like after the pressing process step.

In contrast, according to this preferred embodiment, such sliding of the powder particles in the vicinity of the press surfaces is reduced significantly, thereby minimizing the disturbance of the orientation as shown in FIGS. 4(a) and 4(b). The reason is as follows. The press surfaces 14a and 16a (made of the BeCu alloy) of the upper and lower punches 14 and 16 are deformed plastically under the forces received from the powder particles 18a. As a result, as schematically shown in FIG. 5, fine unevenness is created on the BeCu alloy press surface 16a of the lower punch 16. This unevenness is represented by a surface roughness Ra of 0.05 µm to 12.5 µm. The press surface 16a is illustrated in FIG. 5. However, a similar unevenness is created on the press surface 14a, too. Such fine unevenness created on the press surfaces 14a and 16a reduce the sliding of the powder particles 18a significantly, thereby minimizing the disturbance of the orientation.

As described above, the magnetic powder particles 18a are magnetically coupled together under the magnetic field. Accordingly, the motion of the powder particles inside of the cavity is dominated by that of the powder particles in the vicinity of the press surfaces 14a and 16a. For that reason, just by deforming the press surfaces 14a and 16a plastically in accordance with the shapes of the powder particles 18a contacting with the press surfaces 14a and 16a, the decrease in the degree of alignment can be minimized for all of the powder particles 18a within the cavity.

It should be noted that the unevenness of the press surfaces 14a and 16a is transferred onto the surface of the resultant compact 24. However, by polishing the surface of the magnet after that depending on the necessity, such transferred patterns can be removed easily and the magnet surface can be smoothed out.

In the preferred embodiment described above, the press surfaces 14a and 16a are fully made of the BeCu alloy. Alternatively, as shown in FIGS. 6(a) through 6(d), some region(s) (i.e., first region(s)) 16b of the press surface 16a may be made of the BeCu alloy, while the other region(s) (i.e., second region(s)) 16c may be made of a non-magnetic cemented carbide (e.g., WC—Ni with a Vickers hardness of 1,200 and a permeability of 1.0003) or a high manganese steel (with a Vickers hardness of 460 and a permeability of 1.004). Naturally, the press surface 14a, as well as the press surface 16a, may also include the first and second regions.

The Vickers hardness of the material of the second region 16c may be higher than that of the material of the first region, may exceed 450, and is preferably 700 or more. If a material with a Vickers hardness of 700 or more is used, then the material is hardly worn out even with continuous use and may be used over and over again by reforming the first region only. As described above, the press surface 16a is preferably made of material with a permeability of 1.01 or less. Accordingly, the second region 16c is also preferably made of a material with a permeability of 1.01 or less. The permeability is more preferably 1.001 or less.

Figure 6:
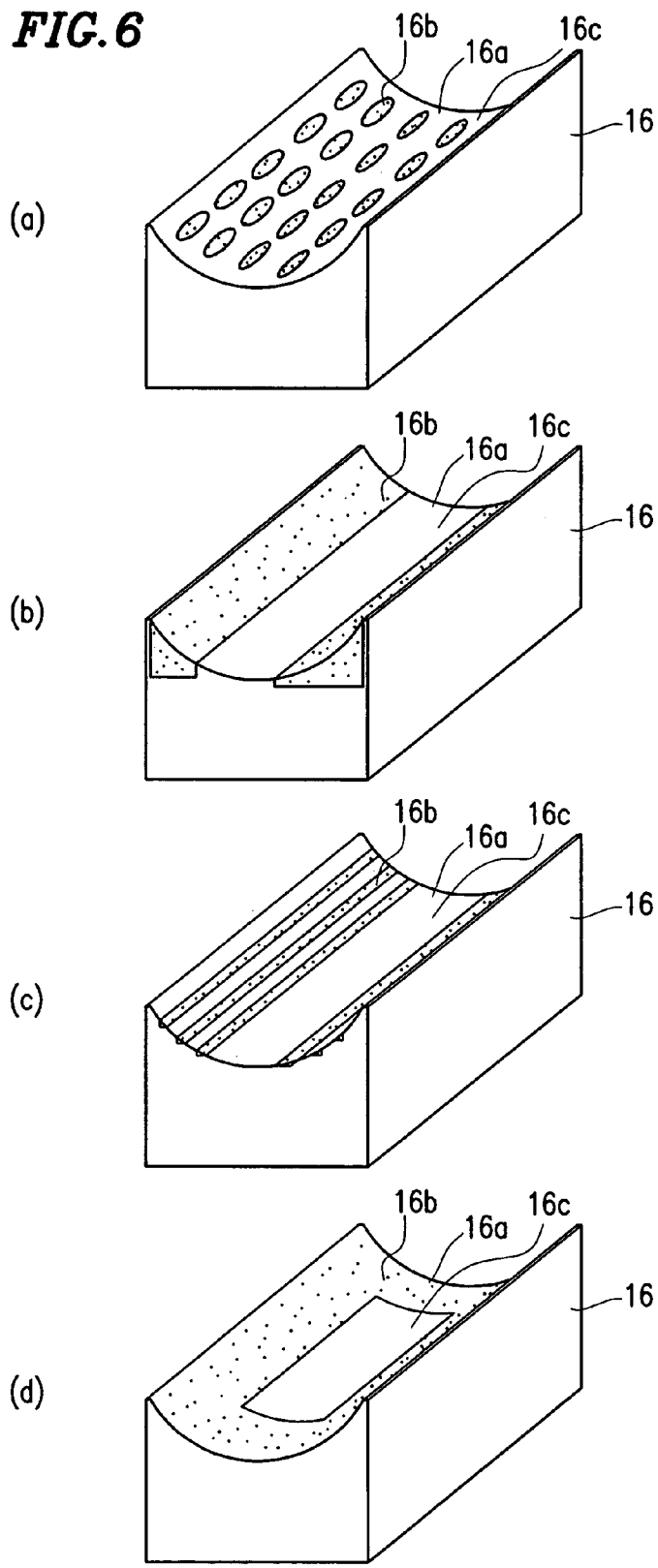
FIGS. 6(a), 6(b), 6(c) and 6(d) are perspective views schematically illustrating lower punches 16 which may be used in various preferred embodiments of the present invention.

On the press surface 16a, the first and second regions 16b and 16c may be arranged in various patterns including those illustrated in FIGS. 6(a) through 6(d), for example. Specifically, as shown in FIG. 6(a), a plurality of first regions 16b may be uniformly arranged as small islands on the front of the press surface 16a. Alternatively, as shown in FIGS. 6(b) through 6(d), the first region(s) 16b may be either selectively provided or concentrated where the orientation of the magnetic particles is easily disturbed. If a plurality of first regions 16b are provided, the size and shape of each first region 16b are not particularly limited but may be appropriately determined according to the method of forming the press surface 16a.

The region where the orientation of the magnetic particles is easily disturbed shifts according to the shape of the press surface 16a (and/or the press surface 14a), the relationship between the direction of the aligning magnetic field and the pressing direction, and the direction in which an agitator moves when the powder is loaded by the slicing technique. Accordingly, the location(s) of the first region(s) 16b may be determined in view of these factors. In the illustrated parallel pressing process, the orientation is disturbed particularly easily in the peripheral regions of the press surface 16a with large tilt angles. Accordingly, in the examples illustrated in FIGS. 6(b) through 6(d), the first regions 16b are provided in such regions of the press surface 16a. In this case, the tilt angle of the press surface 16a is defined with a plane perpendicular to the pressing direction (which is normally a horizontal plane) used as a reference plane.

The first region(s) 16b may be provided on the press surface 16a by the following method, for example. Specifically, the body portion of the lower punch 16 may be formed with the material of the second region(s) 16c (e.g., a non-magnetic cemented carbide). Then, holes or grooves may be provided in the regions to be the first regions 16b and then the BeCu alloy may be injected into, or welded with, those holes or grooves. To minimize the disturbance in the orientation of the powder particles, the BeCu alloy making the first regions 16b may have a thickness of at least several μm. To achieve a sufficient degree of plastic deformation, the thickness of the BeCu alloy is preferably 2 mm or more. The thickness of the BeCu alloy may be appropriately determined by the specific method of forming the first regions 16b, for example.

In forming a C- or arched compact for use in a motor, at least a portion of the press surface 16a that will make the convex surface of the compact is preferably made of the BeCu alloy. Then, the orientation disturbance can be minimized and the cogging torque can be reduced effectively.

Method of Making Alloy Powder

The present invention can be used effectively to produce a rare-earth sintered magnet and is particularly effective in producing an R-T-(M)-B based high-performance rare-earth sintered magnet.

Cast flakes of an R-T-(M)-B based rare-earth magnet alloy are prepared by a known strip-casting process. Specifically, an alloy, having a composition consisting of 30 wt % of Nd, 1.0 wt % of B, 1.2 wt % of Dy, 0.2 wt % of Al, 0.9 wt % of Co and Fe and inevitable impurities as the balance, is melted by a high-frequency melting process, thereby obtaining a molten alloy. The molten alloy is maintained at 1,350° C. and then rapidly cooled by a single roller process to obtain alloy cast flakes with a thickness of 0.3 mm. In this case, the conditions of the rapid cooling process include a roller peripheral velocity of about 1 m/s, a cooling rate of 500° C./min and a supercooling rate of 180° C. The rapid cooling rate is defined at $10^{2°}$ C./s to $10^{4°}$ C./s.

The rapidly solidified alloy obtained in this manner has a thickness of 0.03 mm to 10 mm. The alloy includes $R_2T_{14}B$ crystal grains with a minor-axis size of 0.1 μm to 100 μm and a major-axis size of 5 μm to 500 μm and R-rich phases dispersed on the grain boundary of the $R_2T_{14}B$ crystal grains. The thickness of the R-rich phases is 10 μm or less. A method of making a material alloy by the strip-casting process is disclosed in U.S. Pat. No. 5,383,978, for example. The R-T-(M)-B based rare-earth magnet alloy powder has an elongated shape with a high aspect ratio and exhibits poor flowability (or compactibility) in the compressing process.

Next, the coarsely pulverized material alloy is loaded into material packs, which are subsequently put on a rack. Thereafter, the rack loaded with the material packs is transported to the front of a hydrogen furnace using a material transporter and then introduced into the hydrogen furnace. Then, a hydrogen pulverization process is started in the hydrogen furnace. That is to say, the material alloy is heated and subjected to the hydrogen pulverization process inside of the hydrogen furnace. The material alloy, coarsely pulverized in this manner, is preferably unloaded after the temperature of the alloy has decreased approximately to room temperature. However, even if the material alloy is unloaded while the temperature of the alloy is still high (e.g., in the range of 40° C. to 80° C.), the alloy is not oxidized so seriously unless the alloy is exposed to the air. As a result of this hydrogen pulverization process, the rare-earth alloy is pulverized to a size of about 0.1 mm to about 1.0 mm. As described above, before subjected to this hydrogen pulverization process, the material alloy has preferably been pulverized more coarsely into flakes with a mean particle size of 1 mm to 10 mm.

After the material alloy has been pulverized by this hydrogen pulverization process, the alloy with increased brittleness is preferably pulverized more finely and cooled using a cooling machine such as a rotary cooler, for example. If the material unloaded still has a relatively high temperature, then the material should be cooled for a rather long time by the rotary cooler.

Thereafter, the material powder, which has been cooled to the vicinity of room temperature by the rotary cooler, is further pulverized even more finely by a pulverizer such as a jet mill to make a fine material powder. In view of the resultant magnetic properties, the fine powder preferably has a mean particle size (i.e., FSSS particle size) of 2 μm to 10 μm. In this preferred embodiment, the material powder is finely pulverized using a jet mill within a nitrogen gas atmosphere, thereby obtaining an alloy powder with a mean particle size of about 3.5 μm. The concentration of oxygen in this nitrogen gas atmosphere is preferably as low as about 10,000 ppm. Such a jet mill is disclosed in Japanese Patent Gazette for Opposition No. 6-6728, for example. More specifically, the weight of oxygen included in the finely pulverized alloy powder is preferably adjusted to 6,000 ppm or less by controlling the concentration of an oxidizing gas (i.e., oxygen or water vapor) in the atmospheric gas for use in the fine pulverization process. This is because if the weight of oxygen included in the rare-earth alloy powder exceeds 6,000 ppm, then the total percentage of non-magnetic oxides to the resultant sintered magnet is too high to achieve good magnetic properties.

Subsequently, 0.3 wt % of lubricant is added to, and mixed with, this alloy powder in a rocking mixer, thereby coating the surface of the alloy powder particles with the lubricant. As the lubricant, a fatty ester diluted with a petroleum solvent may be used. In this preferred embodiment, methyl caproate is used as the fatty ester and isoparaffin is used as the petroleum solvent. Methyl caproate and isoparaffin may be mixed at a weight ratio of 1:9, for example. Such a liquid lubricant not only prevents the oxidation of the powder particles by coating the surface thereof but also improves the degree of alignment of the powder being pressed and the powder compactibility (i.e., how easy the resultant compact can be removed).

It should be noted that the lubricant is not limited to the exemplified type. For example, methyl caproate as the fatty ester may be replaced with methyl caprylate, methyl laurylate or methyl laurate. Examples of preferred solvents include petroleum solvents such as isoparaffin and naphthene solvents. The lubricant may be added at any time: before, while or after the fine pulverization process. A solid (dry) lubricant such as zinc stearate may also be used instead of, or in addition to, the liquid lubricant.

It should be noted that the powder made by this method has a sharp particle size distribution and therefore exhibits poor flowability. Accordingly, if the powder is compressed in the same direction as its orientation direction, then the orientation tends to be disturbed easily during the pressing process. Also, by adding a lubricant such as a fatty ester, the respective powder particles can be aligned more easily but its flowability deteriorates instead. As a result, the orientation is easily disturbed due to the pressing. Furthermore, if a high aligning magnetic field of 0.8 T to 2.0 T, for example, is applied to achieve high magnetic properties, such orientation disturbance becomes even more significant. In that case, significant effects are achieved according to this preferred embodiment by using a press machine with press surfaces made of the BeCu alloy.

Method for Producing Rare-Earth Magnet

First, the magnetic powder that has been prepared by the method described above is compacted by the press machine shown in FIG. 1 under an aligning magnetic field. After the power has been pressed and compacted in this manner, the resultant powder compact is pushed upward by the lower punch 16 and removed from this press machine. At this point in time, patterns reflecting the fine unevenness on the press surfaces 14a and 16a have been transferred during the pressing process onto the surfaces of the compact (that have been in contact with the press surfaces 14a and 16a). According to this preferred embodiment, a powder compact with hardly disturbed orientation can be obtained as shown in FIG. 4(b).

To release the compact from the die more easily and more smoothly, the press surfaces may be coated with a release agent either entirely or partially before the powder is loaded thereto. The release agent is preferably obtained by diluting a fatty ester with a solvent. Specifically, examples of preferred fatty esters include methyl caproate, methyl caprylate, methyl laurylate and methyl laurate. A petroleum solvent such as isoparaffin may be used as the solvent. And the fatty ester and solvent may be mixed at a weight ratio of 1:20 to 1:1. Optionally, the fatty acid may include 1.0 wt % or less of arachidic acid.

Next, the compacts are placed onto a sintering plate (with a thickness of 0.5 mm to 3 mm). The plate may be made of a molybdenum material, for example. The compacts 24 on the plate are loaded into a sintering case. The sintering case loaded with the compacts 24 is transported into, and subjected to a known sintering process at, a sintering furnace. As a result of this sintering process, the compacts turn into sintered bodies.

Thereafter, the surface of the sintered bodies is polished if necessary. On the surface of the as-sintered compacts, surface patterns corresponding to the fine unevenness on the press surfaces 14a and 16a are still left. Part or all of these surface patterns may be removed by the polishing process. After or instead of this polishing process, the process of coating the surface of the sintered bodies with a resin film, for example, may also be carried out. In this manner, final products, or rare-earth magnets, are obtained.

Preferred embodiments of the present invention have been described as being applied to a rare-earth magnet having such a shape as being usable effectively in a motor or any other rotating machine. However, the present invention is in no way limited to those specific preferred embodiments.

In the magnet shown in FIG. 2, the upper and lower surfaces thereof are both curved. However, the effects of the present invention are also achieved fully even if just one of the two surfaces is curved. In that case, the press surface of the punch to form the non-curved flat surface may be made of the same material as the conventional one (e.g., a cemented carbide).

Also, as already described with reference to FIG. 1(a), the surface of the magnetic powder 18 that has been loaded into the cavity by the slicing filling technique may not be parallel to the surface of the die 12 but tilted toward a certain direction or winding. In that case, even if the two press surfaces are mutually parallel flat planes, those press surfaces in contact with the surfaces of the magnetic powder will be tilted thereto. Accordingly, if the conventional press surfaces, obtained by mirror-polishing a cemented carbide, for example, are used, the orientation disturbance problem arises. However, by using a press machine with press surfaces made of the BeCu alloy, the disturbance in the orientation of the magnetic powder particles can be minimized through the same mechanism as that described above.

EXAMPLE AND COMPARATIVE EXAMPLE

A rare-earth alloy powder was pressed and compacted with the press machine 10 including the press surfaces 14a and 16a made of a BeCu alloy (e.g., BC-2 produced by Sumitomo Special Metals Co., Ltd.) as shown in FIG. 1. In this example, a compact was made so as to have a length of 40 mm as measured in the direction indicated by the arrow B in FIG. 2, a thickness of 7 mm at the center portion thereof as measured in the direction indicated by the arrow A, and a width of 35 mm as measured in the direction perpendicular to both of the arrows A and B and to have a compact density of 4.30 g/cm$^3$. The aligning magnetic field of about 1 MA/m was applied in the pressing direction (i.e., along the arrow A). Thereafter, the compact was sintered at 1,050° C. for two hours within an argon atmosphere, thereby making a magnet. This magnet was magnetized and then the flux density distribution in the vicinity of the surface of the magnet was obtained.

For the purpose of comparison, a similar pressing process was carried out with a press machine including press surfaces made of the conventional cemented carbide, thereby making a magnet as a comparative example.

The flux density distribution obtained for this example was better than that of the comparative example and showed no abnormal distribution resulting from the decrease in the degree of alignment.

Figure 7:
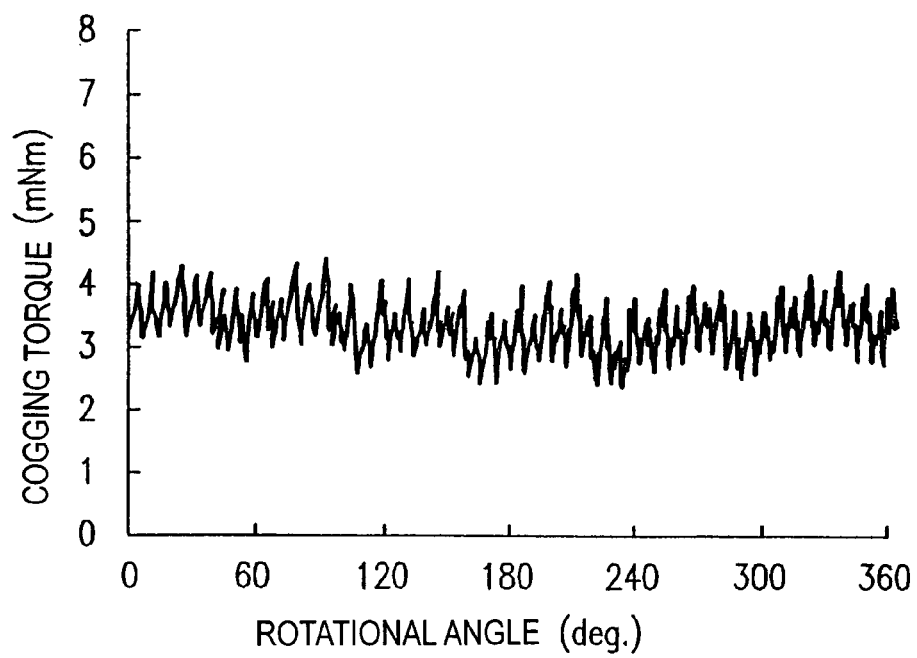
FIG. 7(a) is a graph showing the cogging torque of a motor that was produced with a magnet representing a specific example of the present invention.
FIG. 7(b) is a graph showing the cogging torque of a motor that was produced with a magnet representing a comparative example.
Figure 7:
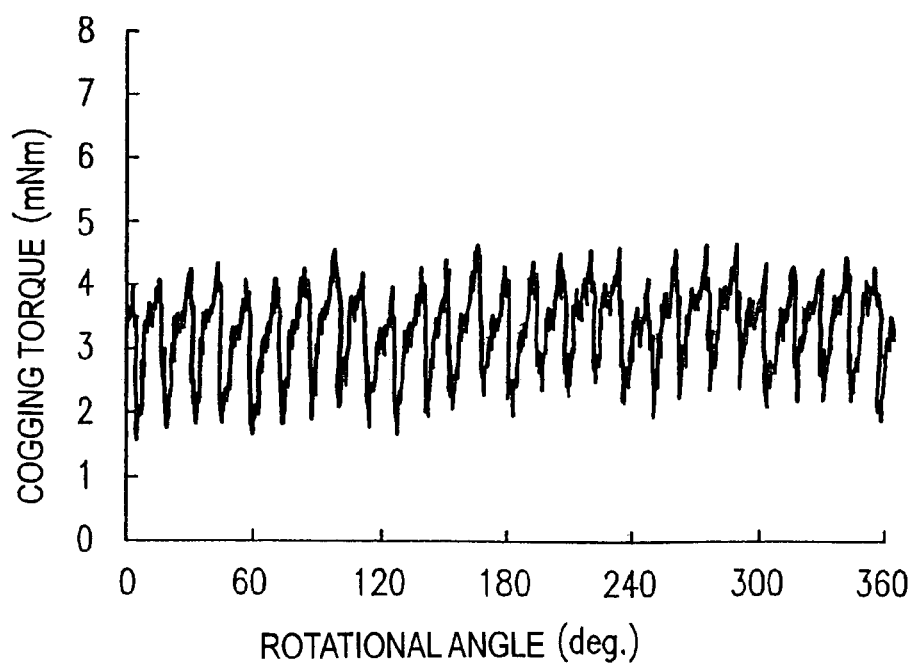

The cogging torque of a motor that was produced using the magnets of this example was measured. The results are shown in FIG. 7(a). For the purpose of comparison, the cogging torque of a motor including the magnets of the comparative example was also measured. The results are shown in FIG. 7(b).

As is clear from the results shown in FIGS. 7(a) and 7(b), the cogging torque of the motor of this example was sufficiently smaller than that of the motor of the comparative example. The reason why the cogging torque of a motor is reduced by the present invention is that the orientation is unlikely to be disturbed in the compact under the pressing process.

INDUSTRIAL APPLICABILITY

In the press machine of the present invention, at least a portion of the press surface thereof is made of a material with an adequate Vickers hardness. Accordingly, while a powder is being pressed under an aligning magnetic field, it is possible to prevent the powder particles from sliding on the press surface, thereby minimizing the disturbance in the orientation of the powder.

A powder compact obtained by using such a press machine achieves uniform alignment, and a rare-earth magnet made of such a compact exhibits excellent magnetic properties.

If a motor is constructed using magnets produced by the method of the present invention, the cogging torque can be reduced.

The invention claimed is:

1. A method for producing a magnet, the method comprising the steps of:
   preparing a magnetic powder;
   loading the magnetic powder into a cavity;
   aligning the magnetic powder by applying an aligning magnetic field to the magnetic powder in the cavity; and
   uniaxially pressing the aligned magnetic powder between two opposed press surfaces to make a compact, at least one of the two press surfaces having a region that is tilted with respect to the surface of the magnetic powder loaded and/or a pressing direction and also having a first region, which is made of a first material with a Vickers hardness that is higher than 200 but equal to or lower than 450.

2. The magnet producing method of claim 1, wherein the at least one press surface further has a second region, which is made of a second material having a higher Vickers hardness than the first material.

3. The magnet producing method of claim 2, wherein the first and second materials have permeabilities of 1.01 or less.

4. The magnet producing method of claim 3, wherein the first material is a BeCu alloy.

5. The magnet producing method of claim 4, wherein the BeCu alloy includes 96.9 mass % to 98.2 mass % of Cu and 1.6 mass % to 2.0 mass % of Be.

6. The magnet producing method of claim 1, wherein the at least one press surface is curved.

7. The magnet producing method of claim 6, wherein the step of uniaxially pressing is the step of making a compact with a C- or arched cross section.

8. The magnet producing method of claim 1, wherein the magnetic powder is loaded into the cavity by a slicing technique.

9. The magnet producing method of claim 1, wherein the aligning magnetic field is parallel to the pressing direction.

10. The magnet producing method of claim 1, wherein the magnetic powder includes a rare-earth alloy powder.

* * * * *